United States Patent
Yao et al.

(10) Patent No.: US 7,096,328 B2
(45) Date of Patent: Aug. 22, 2006

(54) PSEUDORANDOM DATA STORAGE

(75) Inventors: Shu-Yuen Didi Yao, Los Angeles, CA (US); Cyrus Shahabi, Irvine, CA (US); Roger Zimmermann, Walnut, CA (US)

(73) Assignee: University of Southern California, Los Angeles, CA (US)

( * ) Notice: Subject to any disclaimer, the term of this patent is extended or adjusted under 35 U.S.C. 154(b) by 526 days.

(21) Appl. No.: 10/351,269

(22) Filed: Jan. 24, 2003

(65) Prior Publication Data

US 2004/0003173 A1    Jan. 1, 2004

Related U.S. Application Data

(60) Provisional application No. 60/351,998, filed on Jan. 25, 2002.

(51) Int. Cl.
G06F 12/00 (2006.01)

(52) U.S. Cl. ...................... 711/157; 711/165

(58) Field of Classification Search ............... 711/157, 711/153, 148, 114, 165; 714/6
See application file for complete search history.

(56) References Cited

U.S. PATENT DOCUMENTS

| | | | |
|---|---|---|---|
| 4,310,720 A * | 1/1982 | Check, Jr. .................... | 713/155 |
| 6,237,063 B1 | 5/2001 | Bachmat et al. | |
| 6,266,753 B1 | 7/2001 | Hicok et al. | |
| 6,289,102 B1 * | 9/2001 | Ueda et al. .................. | 380/201 |
| 2002/0046359 A1 * | 4/2002 | Boden ........................... | 714/6 |
| 2002/0162047 A1 * | 10/2002 | Peters et al. .................... | 714/5 |
| 2002/0191311 A1 * | 12/2002 | Ulrich et al. .................. | 360/1 |

OTHER PUBLICATIONS

W. Aref, I. Kamel, Niranjan, and S. Ghandeharizadeh. Disk Scheduling for Displaying and Recording Video in Non-Linear News Editing Systems. In Multimedia Computing and Networking Conference, Feb. 1997, 13 pages.

S. Berson, S. Ghandeharizadeh, R. Muntz, and X. Ju. Staggered Striping in Multimedia Information Systems. In Proceedings of the ACM SIGMOD International Conference on Management of Data, 1994, 12 pages.

S. Berson, R. R. Muntz, and W. R. Wong. Randomized Data Allocation for Real-Time Disk I/O. In COMPCON, pp. 286-290, 1996.

J. Buford, editor. Multimedia Systems. Addison-Wesley, 1994, 5 pages.

S. Chung, editor. Multimedia Information Storage and Management. Kluwer Academic Publishers, 1996, 9 pages.

A. Ghafoor. Special Issue on Multimedia Database Systems. ACM Multimedia Systems, 3(5-6), Nov. 1995, 5 pages.

(Continued)

Primary Examiner—Hiep T. Nguyen
(74) Attorney, Agent, or Firm—Fish & Richardson P.C.

(57) ABSTRACT

Systems and techniques to pseudorandomly place and redistribute data blocks in a storage system. In general, in one implementation, the techniques include: distributing data blocks over multiple storage devices according to a reproducible pseudorandom sequence that provides load balancing across the storage devices, and determining current storage locations of the data blocks by reproducing the pseudorandom sequence. The techniques may also include: distributing data blocks over multiple storage devices according to a reproducible pseudorandom sequence, in response to initiation of a storage scaling operation, pseudorandomly redistributing a selected subset of the data blocks and saving information describing the storage scaling operation, determining current storage locations based on the pseudorandom sequence and the saved scaling operation information, and accessing the data blocks according to the determined current storage locations.

38 Claims, 2 Drawing Sheets

OTHER PUBLICATIONS

Figure 1:
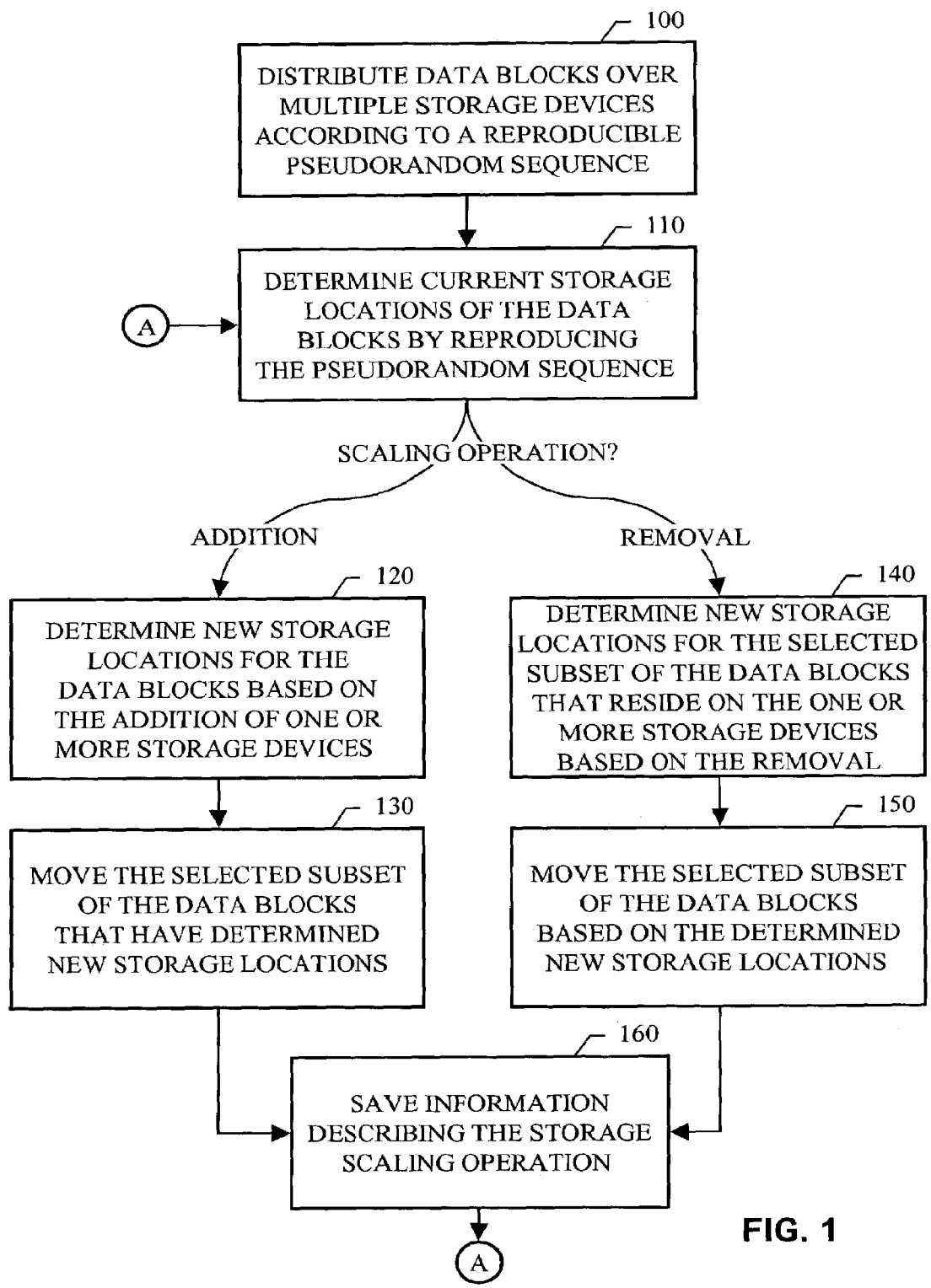

S. Ghandeharizadeh and D. Kim. On-line Reorganization of Data in Scalable Continuous Media Servers. In ® J_k International Conference and Workshop on Database and Expert Systems Applications (DEXA '96), Sep. 1996, 18 pages.

S. Ghandeharizadeh and C. Shahabi. Management of Virtual Replicas in Parallel Multimedia Information Systems. In Proceedings of the Foundations of Data Organization and Algorithms (FODO) Conference, Oct. 1993, 25 pages.

S. Ghandeharizadeh and C. Shahabi. Distributed Multimedia Systems. In J. G. Webster, editor, Wiley Encyclopedia of Electrical and Electronics Engineering. John Wiley and Sons Ltd., New York, 1999, 33 pages.

W. Grosky, R. Jain, and R. Mehrotra, editors. The Handbook of Multimedia Information Management. Prentice-Hall, 1997, 6 pages.

S. H. Kim and S. Ghandeharizadeh. Design of Multi-user Editing Servers for Continuous Media. In IEEE International Workshop on Research Issues in Data Engineering (RIDE'98), Orlando, Florida, Feb. 1998, 8 pages.

R. Muntz, J. Santos, and S. Berson. RIO: A Real-time Multimedia Object Server. In ACM Sigmetrics Performance Evaluation Review, vol. 25, Sep. 1997, 7 pages.

K. Nwosu, B. Thuraisingham, and P. Berra. Multimedia Database Systems-A New Frontier. IEEE Multimedia, 4(3):21-23, Jul.-Sep. 1997.

J. R. Santos and R. R. Muntz. Performance Analysis of the RIO Multimedia Storage System with Heterogeneous Disk Configurations. In ACM Multimedia, pp. 303-308, 1998.

J. R. Santos, R. R. Muntz, and B. Ribeiro-Neto. Comparing Random Data Allocation and Data Striping in Multimedia Servers. In SIGMETRICS, Santa Clara, California, Jun. 17-21, 2000, 12 pages.

C. Shahabi, S. Ghandeharizadeh, and S. Chaudhuri. On Scheduling Atomic and Composite Continuous Media Objects. To appear in IEEE TKDE, 2001, 21 pages.

F. Tobagi, J. Pang, R. Baird, and M. Gang. Streaming RAID-A Disk Array Management System for Video Files. In First ACM Conference on Multimedia, Aug. 1993, 9 pages.

R. Zimmermann and S. Ghandeharizadeh. Continuous Display Using Heterogeneous Disk-Subsystems. In Proceedings of the Fifth ACM Multimedia Conference, pp. 227-236, Seattle, Washington, Nov. 9-13, 1997, 12 pages.

* cited by examiner

PSEUDORANDOM DATA STORAGE

CROSS REFERENCE TO RELATED APPLICATIONS

This application claims the benefit of the priority of U.S. Provisional Application Ser. No. 60/351,998, filed Jan. 25, 2002 and entitled "SCADDAR: AN EFFICIENT RANDOMIZED TECHNIQUE TO REORGANIZE CONTINUOUS MEDIA BLOCKS".

STATEMENT AS TO FEDERALLY SPONSORED RESEARCH

The invention described herein was made in the performance of work funded in part by NSF grants EEC-9529152 (IMSC ERC) and IIS-0082826 and NIH-NLM grant no. R01-LM07061, and is subject to the provisions of Public Law 96-517 (35 U.S.C. 202) in which the contractor has elected to retain title.

BACKGROUND

The present disclosure describes systems and techniques relating to storing data on multiple storage devices.

When storing large amounts of data on multiple storage devices, data placement and retrieval scheduling can be important for the overall efficiency and utility of the storage system. A continuous media (CM) server is an example of a storage system where data placement can be of particular importance. CM objects, such as video and audio files, can be quite large and have significant bandwidth requirements. Moreover, CM servers typically must handle large numbers of simultaneous users.

A common solution for CM servers involves breaking CM objects into fixed sized blocks which are distributed across all the disks in the system. Convention data placement techniques for CM servers, such as round-robin striping, RAID (Redundant Array of Inexpensive Disks) striping and various hybrid approaches, can be categorized as constrained placement approaches. In a constrained placement approach, the location of a data block is fixed and determined by the placement algorithm.

By contrast, a non-constrained placement approach involves maintaining a directory system to keep track of the location of the blocks, thus allowing the blocks to be placed in any location desired and moved as needed. For example, in random placement, a block's location is randomly assigned and then tracked using a directory system. Random placement can provide load balancing by the law of large numbers. Moreover, when performing data access, random placement can eliminate the need for synchronous access cycles, provide a single traffic pattern, and can support unpredictable access patterns, such as those generated by interactive applications or VCR-type operations on CM streams.

SUMMARY

The present disclosure includes systems and techniques relating to storing data across multiple storage devices using a pseudorandom number generator. According to an aspect, data blocks can be distributed over multiple storage devices according to a reproducible pseudorandom sequence that provides load balancing across the storage devices, and current storage locations of the data blocks can be determined by reproducing the pseudorandom sequence.

According to another aspect, data blocks can be distributed over multiple storage devices according to a reproducible pseudorandom sequence, a selected subset of the data blocks can be pseudorandomly redistributed and information describing a storage scaling operation can be saved in response to initiation of the storage scaling operation, current storage locations can be determined based on the pseudorandom sequence and the saved scaling operation information, and the data blocks can be accessed according to the determined current storage locations.

The systems and techniques described can result in high effective storage utilization, and the locations of data blocks can be calculated quickly and efficiently both before and after a scaling operation. A series of remap functions may be used to derive the current location of a block using the pre-scaling location of the block as a basis. Redistributed blocks may still be retrieved, as normal, through relatively low complexity computation. The new locations of blocks can be computed on the fly for each block access by using a series of inexpensive mod and div functions. Randomized block placement can be maintained for successive scaling operations which, in turn, preserves load balancing across the disks, and the amount of block movement can be minimized during redistribution, while maintaining an overall uniform distribution, providing load balancing during access after multiple scaling operations.

Scaling can be performed while the storage system stays online. As media sizes, bandwidth requirements, and media libraries increase, scaling can be performed without requiring downtime and without significantly affecting uptime services. This can be particularly advantageous in the CM server context, where data can be efficiently redistributed to newly added disks without interruption to the activity of the CM server, minimizing downtime and minimizing the impact on services of redistribution during uptime.

A storage system can be provided with a fully scalable architecture, thus reducing the importance of an initial assessment of the future amount of capacity and/or bandwidth needed. Even after many scaling operations, all blocks can be located with only one disk access. Moreover, groups of disks can be added or removed all at once in a scaling operation, and multiple scaling operations of different types (adds or removes) can be performed over time while still maintaining efficient access times to data.

DRAWING DESCRIPTIONS

Figure 2:
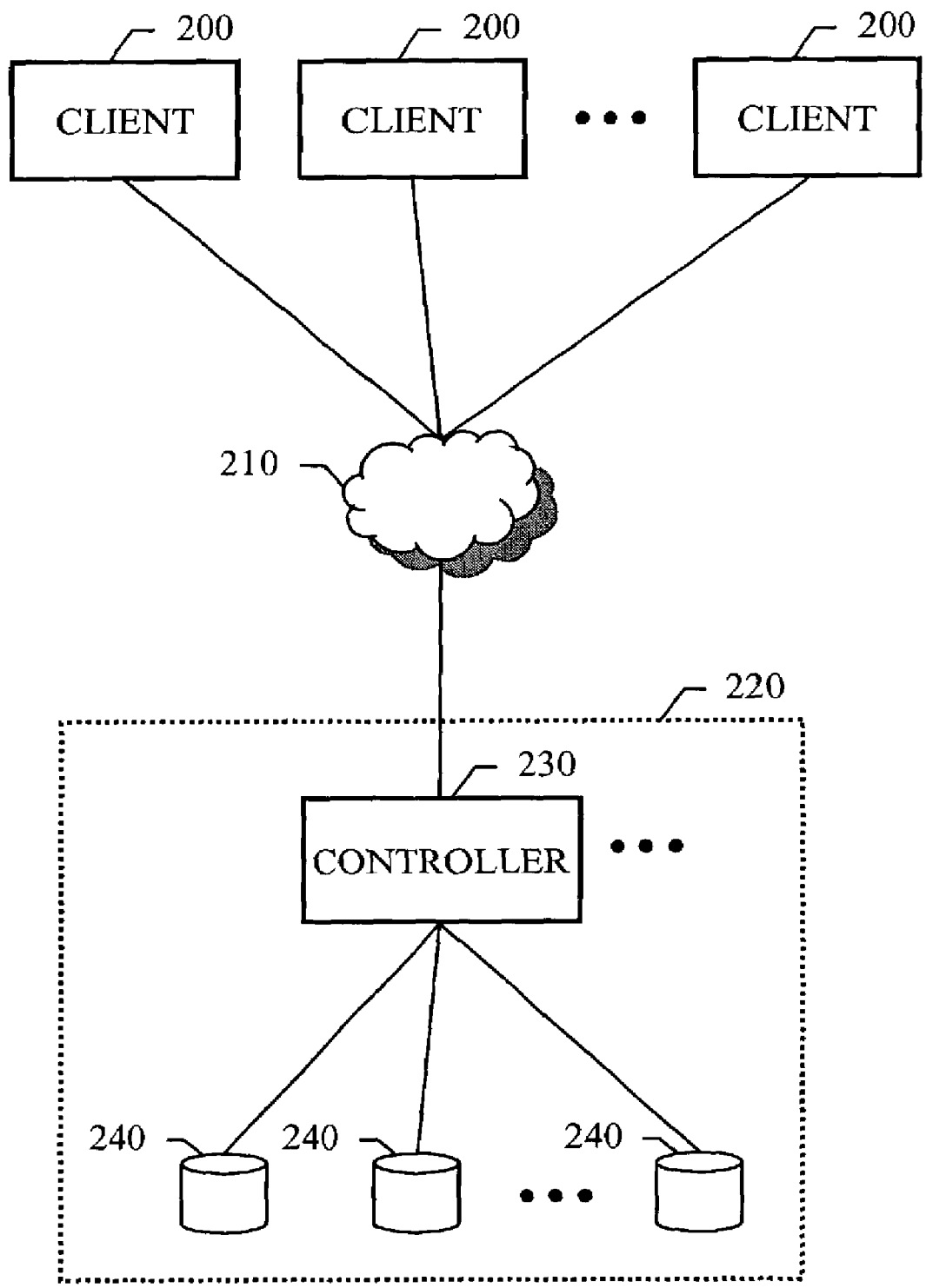

FIG. 1 illustrates pseudorandom data storage and scaling.
FIG. 2 is a block diagram illustrating an example operational environment.

DETAILED DESCRIPTION

The systems and techniques described relate to storing data across multiple storage devices using a pseudorandom number generator. Pseudorandom data placement can result in an effectively random block placement and overall uniform distribution, providing load balancing, but without requiring maintenance of a large directory system for the data blocks. A uniform distribution means that the storage devices contain similar numbers of blocks. Blocks can be placed according to a pseudorandom sequence generated by a pseudorandom number generator seeded with a selected number. With pseudorandom placement, a pseudorandom number X is generated for a data block, and the block can be placed on storage device (X mod N), where N is the total number of storage devices.

The pseudorandom numbers in the pseudorandom sequence are effectively random numbers generated by a definite, nonrandom computational process. Because of this, the entire pseudorandom sequence can be regenerated as needed using the pseudorandom number generator and the original seed number. Thus, object retrieval depends on knowing the pseudorandom number generator and seed. A large directory system need not be maintained in order to retrieve the stored data. Such directory systems can become a bottleneck if stored at a central location and can require complex methods of maintaining consistency if stored in multiple locations.

Additionally, when data blocks are stored pseudorandomly, efficiencies can be obtained when performing scaling operations by minimizing the number of blocks that are redistributed during a scaling operation. This creates an easily scalable storage architecture. A scalable storage architecture allows adding of storage devices to increase storage capacity and/or bandwidth. In its general form, storage scaling also refers to storage device removals when either capacity needs to be conserved or old disks are retired. As used herein, the term "disk" refers to storage devices generally and is not limited to particular disk drive technology or machine-readable media, either magnetic or optical based.

Redistributing blocks placed in a randomized manner may require less overhead when compared to redistributing blocks placed using a constrained placement technique. For example, with round-robin striping, when adding or removing a disk, almost all the data blocks need to be moved to another disk. In contrast, with a randomized placement, only a fraction of all data blocks need to be relocated. That is, only enough data blocks are moved to fill an appropriate fraction of the new disks. For disk removal, only the data blocks on the removed disk are moved.

After such a scaling operation, whether an addition or removal of one or more storage devices, the overall distribution maintains the load balancing characteristic. The redistribution with randomized placement described herein can ensure that data blocks are still essentially randomly placed after disk scaling in order to balance the load on the multiple disks. Thus the storage architecture described can be fully scalable.

FIG. 1 illustrates pseudorandom data storage and scaling. Multiple data blocks are distributed over multiple storage devices according to a reproducible pseudorandom sequence at 100. The data blocks can be any related segments of data. The data blocks can be portions of a file or portions of some other data object. Thus, although sometimes discussed in the context of continuous media servers, the systems and techniques described can be applied in other storage system contexts, such as at a storage management level (e.g., the data blocks can be extents).

The pseudorandom sequence may be generated by a standard pseudorandom number generator, such as the generator defined by the standard C language library functions rand and srand. Alternatively, the pseudorandom sequence may be generated by a pseudorandom number generator tailored to a specific application. The pseudorandom sequence provides load balancing across the storage devices. For example, when the data blocks correspond to a single large file, the distribution created by the pseudorandom sequence can result in uniform load on the storage devices over the course of access to the file. In general, the pseudorandom sequence results in the blocks having roughly equal probabilities of residing on any of the storage devices.

Given a data block number in a sequence of related data blocks, $X_0$ is defined as the random number, with range $0 \ldots R$, generated by a pseudorandom number generator for this block before any scaling operations (the subscript zero represents zero scaling operations). The initial disk number, $D_0$, in which a block resides can be defined as:

$$D_0 = (X_0 \bmod N_0) \qquad (1)$$

where $N_0$ is the total number of storage devices after zero scaling operations. The disk number may or may not correspond to a specific disk of that number in a storage system, because various mappings and/or disk offsets may be used to derive a final disk location from the disk number.

To compute the disk number for block i, a function p_r( ), which is defined by the pseudorandom number generator, can be called i times after being seeded with a seed, s, to obtain the number $X_0$ for block i. The seed, s, is preferably unique for each sequence of related data blocks to be stored (e.g., a unique seed for each file). The function, p_r( ), returns a b-bit random number in the range of $0 \ldots R$, where R is $2^b - 1$. When reseeded with s, p_r( ) will produce the identical pseudorandom sequence produced previously for that seed. Table 1 lists parameters and definitions used herein.

TABLE 1

| Term | Definition |
| --- | --- |
| R | $2^b - 1$ where b is the bit length of p_r(s)'s return value. |
| s | Seed used by p_r( ) to retrieve block locations of an object. |
| p_r(s) | Function that returns a unique random sequence for each unique seed s. Each iteration returns the next element, in the range of $0 \ldots R$, of the sequence. |
| $N_0$ | Initial number of disks before any scaling operations. |
| $X_0$ | Random number for $i^{th}$ iteration of p_r( ) for the $i^{th}$ block (i is usually ignored in the notations for purposes of simplicity) |
| $D_0$ | Disk on which a block of object m resides. $D_0 = X_0$ mode $N_0$ |
| $REMAP_j$ | Function that remaps $X_{j-1}$ to $X_j$, where $REMAP_0$ = p r(s) |
| $N_j$ | Total number of disks after j scaling operations. |
| $X_j$ | Random number derived from a series of REMAP functions, $REMAP_0 \ldots REMAP_j$, after j scaling operations. |
| $D_j$ | Disk on which a block of an object resides, after j scaling operations. $D_j = X_j \bmod N_j$ |

Current storage locations of the data blocks are determined by reproducing the pseudorandom sequence at 110. Access to the data blocks, such as in order to provide continuous media data to clients, is performed according to the determined current storage locations. When a storage scaling operation is initiated, a selected subset of the data blocks are redistributed, and information describing the storage scaling operation is saved. The information can be saved in a storage structure for recording scaling operations and/or can be saved directly into a module used to determine current storage locations of the data blocks. The storage structure can be small enough to be retained entirely in fast memory, thus not requiring an access to slower media, such as a hard disk, to access the scaling operation information. After each scaling operation, an access function incorporates the saved scaling information.

The storage structure can also be used to maintain the seed values and/or the disk location of the first block, if desired. Alternatively, a first block location need not be saved, and the seed values may be calculated from some other saved value. For example, the seed values can be derived from a file name corresponding the data blocks, such as by using the standard C language library function atoi( ) to convert the file name to a long unsigned integer.

After one or more scaling operations are performed, determining the current storage locations can involve computing the current storage locations of the data blocks based on the reproduced pseudorandom sequence and the saved scaling operation information. A scaling operation involves the addition or removal of a disk group, which is one or more storage devices. A scaling operation can be initiated by a system administrator and can be performed while a storage system remains online and operational. For example, moving the data blocks can involve first copying the data blocks to their new locations, switching the storage system from using the previous set of disks to using the new set of disks, and then deleting the original block copies, such as during system idle times.

A scaling operation on a storage system with N disks either adds or removes one disk group. The initial number of disks in the storage system is denoted as $N_0$ and, subsequently, the number of disks after j scaling operations is denoted as $N_j$. During scaling operation j, a redistribution function, RF( ), redistributes the blocks residing on $N_{j-1}$ to $N_j$ disks. Consequently, after scaling operation j, a new access function, AF( ), is used to identify the location of a block, since its location might have been changed due to the scaling operation.

Scaling up increases the total number of disks, and this means that a minimum of $(N_j-N_{j-1})/N_j$ fraction of all the blocks should be moved onto the added disk(s) in order to maintain load balancing across the disks the storage system. Likewise, when scaling down, all blocks on the removed disk(s) should be moved and randomly redistributed across remaining disks to maintain load balancing. These block-movements are the theoretical minimum needed to maintain an even load. In the case of scaling up, blocks are only moved from old disk(s) to new disk(s) and in the case of scaling down, blocks are only moved from the removed disk(s) to the non-removed disk(s).

The original seed used to reproduce the sequence of disk locations should no longer be used in the same manner to reproduce the blocks' new sequence, because this may result in loss of the effectively random placement after a scaling operation. Ideally, a new sequence that maintains the overall randomized placement can be derived using a simple computation, with the least possible movement of blocks and the same original seed, no matter how many scaling operations are performed. Alternatively, the new sequence can be derived using a simple computation to maintain the load balancing and random distribution of data blocks with an upper limit on the number of scaling operations allowed before a full redistribution of all data blocks needs to be performed. The problem can be formally stated as:

Problem 1: Given j scaling operations on $N_0$ disks, find RF( ) such that:

Redistribution Objective One [RO1]: Block movement is minimized during redistribution. Only $z_j \times B$ blocks should be moved, where:

$$z_j \approx \frac{|N_j - N_{j-1}|}{\max(N_j, N_{j-1})} \quad (2)$$

and B is the total number of data blocks.

Redistribution Objective Two [RO2]: Randomization of all object blocks is maintained. Randomization leads to load balancing of all blocks across all disks where $E[n_0] \approx E[n_1] \approx E[n_2] \approx \ldots \approx E[n_{N_{j-1}}]$. $E[n_k]$ is the expected number of blocks on disk k.

Problem 2: Find the corresponding AF( ) such that:

Access Objective One [AO1]: CPU (Central Processing Unit(s)) and disk I/O (Input/Output) overhead are minimized using a low complexity function to compute a block location.

In order to maintain load balancing and a randomized distribution of data blocks after scaling operation j, a new pseudorandom number sequence, $X_j^i$ should be used to identify and track new block locations. The new sequence, $X_j^i$, indicates where blocks should reside after the $j^{th}$ scaling operation in that the block location is derived from $D_j$, which could either indicate a new location for a block or the previous location of that block. The new sequence, $X_j^1$, should be obtainable from the original sequence, $X_0^i$.

If a new sequence of $X_j$'s can be found for each scaling operation, then the block location after the $j^{th}$ scaling operation can be found by computing $D_j$. AF( ) and RF( ) can be designed to compute the new $X_j$ random numbers for every block while maintaining the objectives RO1, RO2 AO1. The random numbers used to determine the location of each block are remapped into a new set of random numbers (one for each block) such that these new numbers can be used to determine the block locations after a scaling operation.

The manner in which this remapping is performed depends on whether the scaling operation is an addition of a disk group or a removal of a disk group.

If the scaling operation is an addition, new storage locations can be determined for the data blocks based on the addition of one or more storage devices at 120. Then, the selected subset of the data blocks that have determined new storage locations on the one or more added storage devices can be moved at 130. Although new storage locations are determined for all the data blocks, only those data blocks that have newly determined storage locations falling on the added storage device(s) are in the selected subset and are thus moved (i.e., selection of the blocks to be moved for an addition is based on which blocks would fall on the new disk(s) if a full redistribution were performed).

Data blocks with newly determined storage locations falling on the current storage devices are left in place, even if the newly determined location for a data block would be a different storage device of the current storage devices. Determining new storage locations for all the data blocks maintains the objective RO2, whereas only moving the data blocks that fall on the new storage device(s) according to the newly determined storage locations maintains the objective RO1.

By contrast, if the scaling operation is a removal, new storage locations can be determined for the selected subset of the data blocks that reside on the one or more storage devices based on the removal of the one or more storage devices at 140. Then, the selected subset of the data blocks can be moved based on the determined new storage locations at 150. The selected subset is made up of all data blocks residing on the storage device(s) being removed (i.e., selection of the blocks to be moved for a removal is based on which blocks currently reside on the disk(s) to be removed).

Both objectives RO1 and RO2 can be maintained even though new storage locations are determined only for those data blocks in the selected subset. The new storage locations are determined based on the removal of the storage device(s) because the removal can cause renumbering of the storage devices. For example, if disk 5 of a ten-disk system is removed during scaling operation j, then $D_j=7$ represents a different physical disk than $D_{j-1}=7$.

The information describing the storage scaling operation can be saved at 160. This information includes how many disks were added or removed, and which disk(s) in the case of a removal. The scaling operation information is then used in the future to determine current storage locations at 110. For j scaling operations, there may be up to j+1 X values calculated ($X_0$ to $X_j$) to determine the location of a data block. But all of these calculations are relatively simple, using mod and div calculations and conditional branching. Thus the objective AO1 is maintained as well.

Each block has a random number, $X_j$, associated with it, and after a scaling operation, each block has a new random number, $X_{j+1}$. Because deriving a block location, such as disk $D_j$, from a random number $X_j$ is straightforward, the discussion below focuses on finding the random number $X_j$ for each block after a scaling operation. New random numbers can be found using a function, $\text{R{\scriptsize EMAP}}_j$, which takes $X_{j-1}$ as input and generates $X_j$ for the scaling operation transition from j–1 to j. $\text{R{\scriptsize EMAP}}_0$ corresponds to the original pseudorandom generator function.

REMAP functions are used within both the AF( ) and RF( ) functions. In particular, during scaling operation j: if disks are added, then RF( ) can apply a sequence of REMAP functions (from $\text{R{\scriptsize EMAP}}_0$ to $\text{R{\scriptsize EMAP}}_j$) to compute $X_j$ for every block on all the disks, which should result in a random selection of blocks to be redistributed to the added disks; and if disks are removed, then RF( ) can apply a sequence of REMAP functions (from $\text{R{\scriptsize EMAP}}_0$ to $\text{R{\scriptsize EMAP}}_j$) to compute $X_j$ of every block residing only on those removed disks, which should result in a random redistribution of blocks from the removed disks. Similarly, after scaling operation j, to find the location of block i, AF( ) can apply a sequence of REMAP functions (from $\text{R{\scriptsize EMAP}}_0$ to $\text{R{\scriptsize EMAP}}_j$) to compute $X_j$.

Subsequently, RF( ) and AF( ) compute the location of a block from its random number, $X_j$, such as by using Equation 1. That is, the sequence $X_0, X_1, \ldots, X_j$ can be used to determine the location of a block after each scaling operation.

The redistribution techniques described can be referred to as SCADDAR (SCAling Disks for Data Arranged Randomly). The objectives RO1, RO2 and AO1 for SCADDAR can be restated as follows. The REMAP functions should be designed such that:

RO1: $(X_{j-1} \bmod N_{j-1})$ and $(X_j \bmod N_j)$ should result in different disk numbers for $z_j$ (see Equation 2 in RO1) blocks and not more.

RO2: For those $X_j$'s that $D_{j-1} \neq D_j$, there should be an equal probability that $D_j$ is any of the newly added disks (in the case of addition operations), or any of the non-removed disks (in the case of removal operations).

AO1: The sequence $X_0, X_1, \ldots, X_j$, and hence $D_j$ can be generated with a low complexity.

The design of the REMAP function can determine the overall characteristics of a storage system using these techniques. In a bounded approach to the REMAP function, all of the objectives, RO1, RO2 and AO1, are satisfied for up to k scaling operations. As a storage system approaches k scaling operations, the system can be taken offline and a full redistribution performed to get back to an original pseudo-random distribution state, where all final storage locations are based on $X_0$ values. In a randomized approach to the REMAP function, all of the objectives, RO1, RO2 and AO1, can be satisfied no matter how many scaling operations are performed. The resulting storage system can be fully scalable. Moreover, the storage system can be taken offline, and a full redistribution performed, if and as desired, thus providing the system administrator with full flexibility and control.

The following description covers a bounded approach to the REMAP function. First, $\text{R{\scriptsize EMAP}}_j$ for deriving $X_j$ after a disk group removal during the $j^{th}$ operation is discussed. Next, $\text{R{\scriptsize EMAP}}_j$ for deriving $X_j$ after a disk group addition during the $j^{th}$ operation is discussed. In each case, $X_j$ results after remapping $X_{j-1}$. The following definition, Let $q_j = (X_j \text{ div } N_j)$ and $r_j = (X_j \bmod N_j)$, (i.e., $X_j = q_j \times N_j + r_j$), serves as the underlying basis for computing $\text{R{\scriptsize EMAP}}_j$ in the discussion below.

In order to maintain a random distribution, $X_j$ should have a different source of randomness from $X_{j-1}$. In bounded SCADDAR, $\text{R{\scriptsize EMAP}}_j$ uses $(X_{j-1} \text{ div } N_{j-1})$ as a new source of randomness even though this results in a smaller range. The shrinking range results in a threshold for the maximum number of performable scaling operations. Equation 3 below defines $\text{R{\scriptsize EMAP}}_j$ if scaling operation j is a removal of disk(s):

$$R_{EMAP_j} = X_j = \begin{cases} \text{case\_a:} & q_{j-1} \times N_j + \text{new}(r_{j-1}) \\ \text{case\_b:} & q_{j-1} \end{cases} \quad (3)$$

where case_a is if $r_{j-1}$ is not removed, and case_b is otherwise, and where the function new( ) maps from the previous disk numbers to the new disk numbers, taking into account gaps that might occur from disk removals.

$X_j$ is constructed to contain two retrievable pieces of information: 1) a new source of randomness used for future operations, and 2) the disk location of the block after the $j^{th}$ operation. The new source of randomness is provided by $q_{j-1}$. In case_a, the block remains in its current location, and thus $X_j$ is constructed using the block's current disk location as the remainder as well as the new source of randomness as the quotient in case of future scaling operations. In case_b, the block is moved according to the new source of randomness.

For an addition of a disk group during operation j, a certain percentage of blocks are to be moved and are chosen at random depending on how many disks are being added. Again, a new range of random numbers should be used upon each add operation to maintain the overall random distribution. The new source of randomness is provided by ($q_{j-1}$ div $N_j$), which still has the shrinking range. Equation 4 below defines $R_{EMAP_j}$ if scaling operation j is an addition of disk(s):

$$R_{EMAP_j} = X_j = \begin{cases} \text{case\_a:} & (q_{j-1} \text{ div } N_j) \times N_j + r_{j-1} \\ \text{case\_b:} & (q_{j-1} \text{ div } N_j) \times N_j + (q_{j-1} \text{ mod } N_j) \end{cases} \quad (4)$$

where case_a is if ($q_{j-1}$ mod $N_j$)<$N_{j-1}$, and case_b is otherwise. As before, $X_j$ is constructed to contain the new source of randomness as the quotient and the disk location of the block as the remainder. To uphold RO1, blocks are moved to new disks only if they are randomly selected for the new disk(s); that is, if ($q_{j-1}$ mod $N_j$)$\geq N_{j-1}$ for a particular block (i.e., case_b), then that block is moved to an added disk during operation j, the target disk being packaged as the remainder of $X_j$ after division by $N_j$. After simplifying terms for Equation 4, the result is Equation 5:

$$R_{EMAP_j} = X_j = \begin{cases} \text{case\_a:} & (q_{j-1} - (q_{j-1} \text{ mod } N_j)) + r_{j-1} \\ \text{case\_b:} & q_{j-1} \end{cases} \quad (5)$$

where case_a is if ($q_j$ mod $N_j$)<$N_{j-1}$, and case_b is otherwise.

All the objectives of RF( ) and AF( ) are met using the bounded SCADDAR approach. RO1 is satisfied because only those blocks which need to be moved are moved. Blocks either move onto an added disk or off of a removed disk. RO2 is satisfied because $R_{EMAP_j}$ uses a new source of randomness to compute $X_j$. AO1 is satisfied because block accesses may only require one disk access per block, and block location is determined through computation using inexpensive mod and div functions instead of disk-resident directories.

The following description covers a randomized approach to the $R_{EMAP}$ function, which satisfies the objectives RO1, RO2 and AO1, and can also allow scaling operations to be performed without bound; although in practice, the repeated mod and pseudorandom function calls may eventually require non-negligible computational resources. In a randomized approach, a pseudorandom number generator is used in conjunction with $X_j$ as the new source of randomness after each scaling operation. The pseudorandom number generator can be same generator used in the original distribution of blocks, or it can be one or more alternative pseudorandom number generators.

In the randomized SCADDAR approach described below, the same pseudorandom number generator is used throughout, and the current $X_j$ is used to reseed the generator. Thus, $p\_r(X_j)$ provides the new source of randomness, and $p\_r( )$ should be such that any number in the range 0 . . . R can be used as a seed. This can guarantee a b-bit number is used as the quotient for $X_j$, regardless of the number of scaling operations performed. The seed used for $p\_r( )$ and the random number returned are assumed to be independent for practical purposes here.

In randomized SCADDAR, $X_{j-1}$ is used as the seed of the pseudorandom number generator to obtain $X_j$. $R_{EMAP_j}$ for randomized SCADDAR is constructed in a similar fashion as in bounded SCADDAR, except that $p\_r(X_j)$ is used as the quotient. Equations 6 and 7 define $R_{EMAP_j}$ for a removal of disk(s) and an addition of disk(s), respectively:

$$R_{EMAP_j} = X_j = \begin{cases} \text{case\_a:} & p\_r(X_{j-1}) \times N_j + \text{new}(r_{j-1}) \\ \text{case\_b:} & p\_r(X_{j-1}) \end{cases} \quad (6)$$

where case _a is if $r_{j-1}$ is not removed, and case_b is otherwise;

$$R_{EMAP_j} = X_j = \begin{cases} \text{case\_a:} & p\_r(X_{j-1}) \times N_j + r_{j-1} \\ \text{case\_b:} & p\_r(X_{j-1}) \times N_j + (p\_r(X_{j-1}) \text{ mod } N_j) \end{cases} \quad (7)$$

where case_a is if ($p\_r(X_{j-1})$ mod $N_j$)<$N_{j-1}$, and case_b is otherwise.

Let $X_j$ denote the random number for a block after j scaling operations. A pseudorandom number generator may be considered ideal if all the $X_j$'s are independent and they are all uniformly distributed between 0 and R. Given an ideal pseudorandom number generator, randomized SCADDAR is statistically indistinguishable from complete reorganization in terms of distribution. Although, actual pseudorandom number generators are unlikely to be ideal, simulation of randomized SCADDAR shows that the technique satisfies RO1, RO2 and AO1 for a large number of scaling operations.

FIG. 2 is a block diagram illustrating an example operational environment. One or more clients 200 communicate with a storage system 220 over a network 210. The network 210 provides communication links and may be any communication network linking machines capable of communicating using one or more networking protocols, including a local area network (LAN), metropolitan area network (MAN), wide area network (WAN), enterprise network, virtual private network (VPN), the Internet, etc.

The storage system 220 may be any machine and/or system that stores information and is capable of communicating over the network 210 with other machines coupled with the network 210. The client(s) 200 may be any machines and/or processes capable of communicating over the network 210 with the storage system 220. For example, the storage system 220 may be a CM server (e.g., a video-on-demand system), and the client(s) 200 may be browser applications. The storage system 220 may also be an interactive visualization system, such as a scientific or entertainment visualization system, a file system and/or a database system. In general, the client(s) 200 request resources from the storage system 220, and the storage system 220 provides requested resources to the client(s) 200, if available.

The storage system 220 includes one or more controllers 230 and one or more storage devices 240. The controller(s) 230 may be configured to perform pseudorandom data placement and/or pseudorandom disk scaling, such as described above. The controller(s) 230 may be one or more processing systems, such as one or more general purpose computers programmed to perform the features and functions described. For additional details regarding various example implementations of the storage system 220, see U.S. patent applications Ser. Nos. 10/351,461 and 10/351,462, entitled "CONTINUOUS MEDIA SYSTEM" and "MULTI-THRESHOLD SMOOTHING" respectively, filed on Jan. 24, 2003 and published as U.S. Patent Pub. no.

2003-0161302-A1 on Aug. 28, 2003 and U.S. Patent Pub. no. 2003-0165150-A1 on Sep. 4, 2003.

The storage devices 240 may be any storage system that includes discrete storage media that can be accessed separately. The storage devices 240 may be a storage array or a RAID enclosure. The storage devices 240 may be memory devices, either non-volatile memories or volatile memories, or mass storage media (e.g., disk drives, or potentially separate disk zones on a platter), which may be magnetic-based, optical-based, semiconductor-based media, or a combination of these. Thus, a storage device 240 includes at least one machine-readable medium. As used herein, the term "machine-readable medium" refers to any computer program product, apparatus and/or device that could be used to provide information indicative of machine instructions and/or data to the system 220.

The systems and techniques described above are tailored to homogeneous and/or logical disks, and thus the storage devices 240 should have similar capacity and bandwidth characteristics. When heterogeneous disks are to be used, a mapping between the heterogeneous disks and the logical logical disks can be generated, and the techniques described above can be used with the logical disks. The data blocks can be stored on the heterogeneous disks based on the mapping from the logical disks to the heterogeneous disks.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, configured to receive and/or transmit data and instructions, at least one input device, and at least one output device.

The various implementations described above have been presented by way of example only, and not limitation. For example, the logic flows depicted in FIG. 1 do not require the particular order shown, or sequential order, to achieve desirable results. Other embodiments may be within the scope of the following claims.

What is claimed is:

1. A method comprising:
   distributing data blocks over multiple storage devices according to a reproducible pseudorandom sequence that provides load balancing across the storage devices;
   determining current storage locations of the data blocks by reproducing the pseudorandom sequence; and
   in response to initiation of a storage scaling operation, redistributing a selected subset of the data blocks and saving information describing the storage scaling operation, wherein said determining current storage locations comprises computing the current storage locations of the data blocks based on the reproduced pseudorandom sequence and the saved scaling operation information.

2. The method of claim 1, further comprising accessing the data blocks according to the determined current storage locations.

3. The method of claim 1, wherein the storage scaling operation comprises addition of one or more storage devices, and redistributing the selected subset of the data blocks comprises:
   determining new storage locations for the data blocks based on the addition of the one or more storage devices; and
   moving the selected subset of the data blocks that have determined new storage locations on the one or more added storage devices.

4. The method of claim 1, wherein the storage scaling operation comprises removal of one or more storage devices, and said redistributing the selected subset of the data blocks comprises:
   determining new storage locations for the selected subset of the data blocks that reside on the one or more storage devices based on the removal of the one or more storage devices; and
   moving the selected subset of the data blocks based on the determined new storage locations.

5. The method of claim 1, further comprising transmitting data comprising at least one of the data blocks being accessed according to the determined current storage locations, wherein said redistributing the selected subset of the data blocks comprises, during said transmitting:
   copying the selected subset of the data blocks to newly determined storage locations on a new set of storage devices comprising at least one cf the multiple storage devices;
   switching to the new set of storage devices; and
   deleting unused data blocks during idle times of said transmitting.

6. The method of claim 1, wherein said redistributing the selected subset of the data blocks comprises determining new storage locations based on the pseudorandom sequence used as input to a pseudorandom number generator.

7. The method of claim 6, wherein the pseudorandom number generator is used to generate the pseudorandom sequence.

8. The method of claim 7, further comprising generating the pseudorandom sequence by seeding the pseudorandom number generator with a number derived from an object name corresponding to the data blocks.

9. The method of claim 6, further comprising providing continuous media data to clients.

10. A machine-readable medium embodying information indicative of instructions for causing one or more machines to perform operations comprising:
    distributing data blocks over multiple storage devices according to a reproducible pseudorandom sequence that provides load balancing across the storage devices;
    determining current storage locations of the data blocks by reproducing the pseudorandom sequence; and
    in response to initiation of a storage scaling operation, redistributing a selected subset of the data blocks and saving information describing the storage scaling operation, and wherein said determining current storage locations comprises computing the current storage locations of the data blocks based on the reproduced pseudorandom sequence and the saved scaling operation information.

11. The machine-readable medium of claim 10, wherein the operations further comprise accessing the data blocks according to the determined current storage locations.

12. The machine-readable medium of claim 10, wherein the storage scaling operation comprises addition of one or more storage devices, and redistributing the selected subset of the data blocks comprises:
    determining new storage locations for the data blocks based on the addition of the one or more storage devices; and
    moving the selected subset of the data blocks that have determined new storage locations on the one or more added storage devices.

13. The machine-readable medium of claim 10, wherein the storage scaling operation comprises removal of one or more storage devices, and said redistributing the selected subset of the data blocks comprises:

determining new storage locations for the selected subset of the data blocks that reside on the one or more storage devices based on the removal of the one or more storage devices; and moving the selected subset of the data blocks based on the determined new storage locations.

14. The machine-readable medium of claim 10, wherein the operations further comprise transmitting data comprising at least one of the data blocks being accessed according to the determined current storage locations, and wherein said redistributing the selected subset of the data blocks comprises, during said transmitting:

copying the selected subset of the data blocks to newly determined storage locations on a new set of storage devices comprising at least one cf the multiple storage devices;

switching to the new set of storage devices; and deleting unused data blocks during idle times of said transmitting.

15. The machine-readable medium of claim 10, wherein said redistributing the selected subset of the data blocks comprises determining new storage locations based on the pseudorandom sequence used as input to a pseudorandom number generator.

16. The machine-readable medium of claim 16, wherein the pseudorandom number generator is used to generate the pseudorandom sequence.

17. The machine-readable medium of claim 16, wherein the operations further comprise generating the pseudorandom sequence by seeding the pseudorandom number generator with a number derived from an object name corresponding to the data blocks.

18. The machine-readable medium of claim 15, wherein the operations further comprise providing continuous media data to clients.

19. A method comprising:

distributing data blocks over multiple storage devices according to a reproducible pseudorandom sequence;

in response to initiation of a storage scaling operation, pseudorandomly redistributing a selected subset of the data blocks and saving information describing the storage scaling operation;

determining current storage locations based on the pseudorandom sequence and the saved scaling operation information; and accessing the data blocks according to the determined current storage locations.

20. The method of claim 19, wherein said pseudorandomly redistributing comprises:

seeding a pseudorandom number generator, used to generate the pseudorandom sequence, with one or more numbers from the pseudorandom sequence; and determining one or more new storage locations based on output of the pseudorandom number generator.

21. The method of claim 19, wherein pseudorandomly redistributing comprises pseudorandomly redistributing the selected subset of the data blocks while transmitting data comprising at least one of the data blocks being accessed according to the determined current storage locations.

22. The method of claim 19, wherein the storage scaling operation comprises addition of one or more storage devices, and pseudorandomly redistributing the selected subset of the data blocks comprises:

determining new storage locations for the data blocks based on the addition of the one or more storage devices and based on output of a pseudorandom number generator seeded with one or more numbers from the pseudorandom sequence; and moving the selected subset of the data blocks that have determined new storage locations on the one or more added storage devices.

23. The method of claim 19, wherein the storage scaling operation comprises removal of one or more storage devices, and pseudorandomly redistributing the selected subset of the data blocks comprises:

determining new storage locations for the selected subset of the data blocks that reside on the one or more storage devices based on the removal of the one or more storage devices and based on output of a pseudorandom number generator seeded with one or more numbers from the pseudorandom sequence; and moving the selected subset of the data blocks based on the determined new storage locations.

24. The method of claim 19, further comprising generating the pseudorandom sequence by seeding a pseudorandom number generator with a number derived from an object name corresponding to the data blocks.

25. The method of claim 19, further comprising providing continuous media data to clients, said providing continuous media data comprising said accessing the data blocks.

26. A machine-readable medium embodying information indicative of instructions for causing one or more machines to perform operations comprising:

distributing data blocks over multiple storage devices according to a reproducible pseudorandom sequence;

in response to initiation of a storage scaling operation, pseudorandomly redistributing a selected subset of the data blocks and saving information describing the storage scaling operation;

determining current storage locations based on the pseudorandom sequence and the saved scaling operation information; and accessing the data blocks according to the determined current storage locations.

27. The machine-readable medium of claim 26, wherein said pseudorandomly redistributing comprises:

seeding a pseudorandom number generator, used to generate the pseudorandom sequence, with one or more numbers from the pseudorandom sequence; and determining one or more new storage locations based on output of the pseudorandom number generator.

28. The machine-readable medium of claim 26, wherein pseudorandomly redistributing comprises pseudorandomly redistributing the selected subset of the data blocks while transmitting data comprising at least one of the data blocks being accessed according to the determined current storage locations.

29. The machine-readable medium of claim 26, wherein the storage scaling operation comprises addition of one or more storage devices, and pseudorandomly redistributing the selected subset of the data blocks comprises:

determining new storage locations for the data blocks based on the addition of the one or more storage devices and based on output of a pseudorandom number generator seeded with one or more numbers from the pseudorandom sequence; and moving the selected subset of the data blocks that have determined new storage locations on the one or more added storage devices.

30. The machine-readable medium of claim 26, wherein the storage scaling operation comprises removal of one or more storage devices, and pseudorandomly redistributing the selected subset of the data blocks comprises:
   determining new storage locations for the selected subset of the data blocks that reside on the one or more storage devices based on the removal of the one or more storage devices and based on output of a pseudorandom number generator seeded with one or more numbers from the pseudorandom sequence; and
   moving the selected subset of the data blocks based on the determined new storage locations.

31. The machine-readable medium of claim 26, wherein the operations further comprise generating the pseudorandom sequence by seeding a pseudorandom number generator with a number derived from an object name corresponding to the data blocks.

32. The machine-readable medium of claim 26, wherein the operations further comprise providing continuous media data to clients, said providing continuous media data comprising said accessing the data blocks.

33. A system comprising:
   one or more storage devices; and
   one or more controllers configured to pseudorandomly place data blocks on the one or more storage devices, to perform pseudorandom scaling of the one or more storage devices, and to access the data blocks based on information describing prior pseudorandom scaling.

34. The system of claim 33, further comprising a continuous media server comprising the one or more controllers.

35. The system of claim 34, wherein the one or more storage devices comprise two or more hard drives.

36. A system comprising:
   means for randomized storing of data blocks without maintaining a directory system identifying locations of all the data blocks; and
   means for randomized redistributing of the data blocks such that block movement is minimized.

37. The system of claim 36, further comprising means for transmitting data comprising the data blocks, wherein said means for transmitting and said means for randomized redistributing operate simultaneously.

38. The system of claim 37, wherein the means for randomized storing and the means for randomized redistributing use a single pseudorandom number generator.

* * * * *